(12) United States Patent
Pridmore et al.

(10) Patent No.: US 11,744,169 B2
(45) Date of Patent: *Sep. 5, 2023

(54) PARTICULATE MATERIAL METERING SYSTEM FOR AN AGRICULTURAL IMPLEMENT

(71) Applicant: CNH Industrial Canada, Ltd., Saskatoon (CA)

(72) Inventors: Craig M. Pridmore, Saskatoon (CA); Anthony C. Rapley, Saskatoon (CA); Gregory Jacob Erker, Saskatoon (CA)

(73) Assignee: CNH INDUSTRIAL CANADA, LTD., Saskatoon (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,782

(22) Filed: Jul. 5, 2022

(65) Prior Publication Data

US 2022/0330474 A1 Oct. 20, 2022

Related U.S. Application Data

(63) Continuation of application No. 17/084,024, filed on Oct. 29, 2020.

(Continued)

(51) Int. Cl.
  *A01C 7/10* (2006.01)
  *A01C 21/00* (2006.01)

(52) U.S. Cl.
  CPC .............. *A01C 7/102* (2013.01); *A01C 21/00* (2013.01)

(58) Field of Classification Search
  CPC ........... A01C 7/102; A01C 21/00; A01C 7/10; A01C 7/08; A01C 7/00
  See application file for complete search history.

(56) References Cited

U.S. PATENT DOCUMENTS

| 5,025,951 A | 6/1991 | Hook et al. |
| 5,956,255 A | 9/1999 | Flamme |

(Continued)

FOREIGN PATENT DOCUMENTS

| CA | 2221403 | 5/1999 |
| CA | 2311698 | 12/2001 |

(Continued)

OTHER PUBLICATIONS

Deere Introduces Redesigned N500C Air Drill with ProSeries™ Openers for Small-Grains Producers, https://www.deere.com/en/our-company/news-and-amiouncements/news; Feb. 12, 2019, 5 pgs.

(Continued)

*Primary Examiner* — Christopher J. Novosad
(74) *Attorney, Agent, or Firm* — Rebecca Henkel; Rickard Demille

(57) ABSTRACT

A particulate material metering system includes a controller configured to determine a radius of curvature of a path of a lead vehicle coupled to an agricultural implement. The controller is configured to determine a lead time of the lead vehicle relative to the agricultural implement based on a speed of the lead vehicle and/or the agricultural implement. The controller is configured to determine a radius of curvature of a path of the agricultural implement based on the radius of curvature of the path of the lead vehicle at a determination time, in which the determination time is a current time minus an offset time, and the offset time is based on the lead time. The controller is configured to determine target particulate material flow rates of respective metering devices of the particulate material metering system based on the radius of curvature of the path of the agricultural implement.

20 Claims, 5 Drawing Sheets

Related U.S. Application Data

(60) Provisional application No. 62/936,200, filed on Nov. 15, 2019, provisional application No. 62/935,558, filed on Nov. 14, 2019.

(56) References Cited

U.S. PATENT DOCUMENTS

| | | | |
|---|---|---|---|
| 6,070,538 | A | 6/2000 | Flamme et al. |
| 6,079,340 | A | 6/2000 | Flamme et al. |
| 6,283,679 | B1 | 9/2001 | Gregor et al. |
| 6,285,938 | B1 | 9/2001 | Lang et al. |
| 6,584,920 | B1 | 7/2003 | Cresswell |
| 7,373,890 | B2 | 5/2008 | Kowalchuk |
| 7,395,769 | B2 | 7/2008 | Jensen |
| 7,555,990 | B2 | 7/2009 | Beaujot |
| 7,726,251 | B1 | 6/2010 | Peterson et al. |
| 7,775,167 | B2 | 8/2010 | Stehling et al. |
| 8,001,914 | B2 | 8/2011 | Peterson et al. |
| 8,132,521 | B2 | 3/2012 | Snipes et al. |
| 8,141,504 | B2 | 3/2012 | Dean et al. |
| 8,196,534 | B2 | 6/2012 | Meyer et al. |
| 8,434,416 | B2 | 5/2013 | Kowalchuk et al. |
| 8,504,310 | B2 | 8/2013 | Landphair et al. |
| 8,522,700 | B2 | 9/2013 | Landphair |
| 8,578,870 | B2 | 11/2013 | Beaujot |
| 8,649,942 | B2 | 2/2014 | Mitchell |
| 8,671,857 | B2 | 3/2014 | Kowalchuk et al. |
| 8,683,931 | B1 | 4/2014 | Lafferty |
| 8,850,997 | B2 | 10/2014 | Silbernagel et al. |
| 8,857,353 | B2 | 10/2014 | Kowalchuk |
| 8,869,718 | B2 | 10/2014 | Binsirawanich et al. |
| 8,893,630 | B2 | 11/2014 | Kowalchuk |
| 9,013,749 | B2 | 4/2015 | Miyazaki |
| 9,043,950 | B2 | 6/2015 | Wendte et al. |
| 9,119,338 | B2 | 9/2015 | Alsäter et al. |
| 9,144,190 | B2 | 9/2015 | Henry et al. |
| 9,148,990 | B2 | 10/2015 | Redman et al. |
| 9,232,690 | B2 | 1/2016 | Kowalchuk |
| 9,237,687 | B2 | 1/2016 | Sauder et al. |
| 9,271,439 | B2 | 3/2016 | Bourgault et al. |
| 9,320,192 | B2 | 4/2016 | Steffen et al. |
| 9,398,739 | B2 | 7/2016 | Silbernagel et al. |
| 9,445,540 | B2 | 9/2016 | Ballu |
| 9,521,804 | B2 | 12/2016 | Wendte et al. |
| 9,585,305 | B2 | 3/2017 | Henry et al. |
| 9,609,803 | B2 | 4/2017 | Gervais et al. |
| 9,615,506 | B2 | 4/2017 | Ruppert et al. |
| 9,635,802 | B2 | 5/2017 | Rains et al. |
| 9,733,634 | B2 | 8/2017 | Prickel |
| 9,781,878 | B2 | 10/2017 | Montag |
| 9,788,475 | B2 | 10/2017 | Henry |
| 9,804,608 | B2 | 10/2017 | Chahley et al. |
| 9,894,829 | B2 | 2/2018 | Shivak |
| 9,913,424 | B2 | 3/2018 | Henry |
| 9,936,625 | B2 | 4/2018 | Wendte et al. |
| 10,058,021 | B2 | 8/2018 | Barsi et al. |
| 10,136,573 | B1 | 11/2018 | Arnett et al. |
| 10,143,127 | B2 | 12/2018 | Wilhelmi et al. |
| 10,149,428 | B2 | 12/2018 | Wendte et al. |
| 10,159,177 | B2 | 12/2018 | Gervais et al. |
| 10,244,674 | B2 | 4/2019 | Kinzenbaw et al. |
| 10,368,477 | B2 | 4/2019 | Radtke et al. |
| 10,321,624 | B2 | 6/2019 | Reich et al. |
| 10,375,876 | B2 | 8/2019 | Kordick |
| 2009/0314191 | A1 | 12/2009 | Friggstad |
| 2010/0307394 | A1 | 12/2010 | Snipes et al. |
| 2011/0054743 | A1 | 3/2011 | Kocer et al. |
| 2011/0189440 | A1* | 8/2011 | Appleby ............ B22C 9/10 523/435 |
| 2012/0103238 | A1 | 5/2012 | Beaujot et al. |
| 2012/0169495 | A1 | 7/2012 | Kowalchuk |
| 2012/0174845 | A1 | 7/2012 | Friggstad |
| 2012/0325131 | A1 | 12/2012 | Thompson et al. |
| 2013/0192503 | A1 | 8/2013 | Hemy et al. |
| 2014/0084081 | A1 | 3/2014 | Kunz et al. |
| 2017/0135280 | A1 | 5/2017 | Rosengren et al. |
| 2017/0325399 | A1 | 11/2017 | Heinrich et al. |
| 2018/0000008 | A1 | 1/2018 | Henry |
| 2018/0153093 | A1 | 6/2018 | Koch et al. |
| 2018/0184579 | A1 | 7/2018 | Wendte et al. |
| 2018/0206396 | A1 | 7/2018 | Roberge et al. |
| 2018/0255698 | A1 | 9/2018 | Körösi et al. |
| 2018/0288934 | A1 | 10/2018 | Shivak |
| 2018/0310468 | A1 | 11/2018 | Schoeny et al. |
| 2018/0338409 | A1 | 11/2018 | Heathcote |
| 2018/0359909 | A1 | 12/2018 | Conrad et al. |
| 2019/0000011 | A1 | 1/2019 | Gervais et al. |
| 2019/0037765 | A1 | 2/2019 | Barelson et al. |
| 2019/0050002 | A1 | 2/2019 | Engel et al. |
| 2019/0082585 | A1 | 3/2019 | Felton et al. |
| 2019/0098827 | A1 | 4/2019 | Gilbert et al. |
| 2019/0183038 | A1 | 6/2019 | Kowalchuk |
| 2019/0200518 | A1 | 7/2019 | Kinzenbaw et al. |
| 2019/0235535 | A1 | 8/2019 | Schoeny et al. |
| 2019/0246551 | A1 | 8/2019 | Campbell et al. |

FOREIGN PATENT DOCUMENTS

| | | |
|---|---|---|
| CA | 2398143 | 2/2004 |
| CA | 2884186 | 9/2012 |
| CA | 3008829 | 7/2013 |
| CA | 2841515 | 8/2015 |
| CA | 2949571 | 5/2018 |
| DE | 3310424 | 9/1984 |
| DE | 19723370 | 12/1998 |
| DE | 10154726 | 5/2003 |
| DE | 102004030240 A1 | 2/2005 |
| DE | 102004030240 B4 | 7/2015 |
| DE | 102016012254 | 4/2018 |
| DE | 102017103640 | 8/2018 |
| DE | 102017005094 | 11/2018 |
| EP | 0379231 | 7/1990 |
| EP | 0219015 | 5/1992 |
| EP | 0910939 | 4/1999 |
| EP | 0997064 | 5/2000 |
| EP | 2374342 | 10/2011 |
| EP | 2876993 | 6/2015 |
| EP | 2959762 | 12/2015 |
| EP | 2966965 | 1/2016 |
| EP | 3236208 | 10/2017 |
| EP | 3278646 | 2/2018 |
| EP | 3400765 | 11/2018 |
| EP | 3409090 | 12/2018 |
| EP | 3525567 | 8/2019 |
| WO | WO2012170545 | 12/2012 |

OTHER PUBLICATIONS

Lemken, "Large Area Drill Combination Jantar 12 and Heliodor 12 DS", Nov. 2007, 12 pgs.

Dietz, "Clean Seed CX6 Smart Seeder", Successful Farming, Jan. 30, 2015, https://www.agricultme.com/machineiy/farm-implements/drills/cle-seed-cx6-smart-seeder_232-ar47275; 3 pgs.

Concord in the News; Concord is Back; https://concordseeding.com/company/news/concord-is-back; 2020; 5 pgs.

John Deere, "Air-Seeding Equipment" brochure, 2018, 32 pgs.

\* cited by examiner

PARTICULATE MATERIAL METERING SYSTEM FOR AN AGRICULTURAL IMPLEMENT

CROSS REFERENCE TO RELATED APPLICATIONS

This application is a continuation of U.S. application Ser. No. 17/084,024, entitled "PARTICULATE MATERIAL METERING SYSTEM FOR AN AGRICULTURAL IMPLEMENT", filed Oct. 29, 2020, which claims priority from and the benefit of U.S. Provisional Application Ser. No. 62/935,558, entitled "PARTICULATE MATERIAL METERING SYSTEM FOR AN AGRICULTURAL IMPLEMENT", filed Nov. 14, 2019, and U.S. Provisional Application Ser. No. 62/936,200, entitled "PARTICULATE MATERIAL METERING SYSTEM FOR AN AGRICULTURAL IMPLEMENT", filed Nov. 15, 2019. Each of the above-referenced applications is hereby incorporated by reference in its entirety.

BACKGROUND

The present disclosure relates generally to a particulate material metering system for an agricultural implement.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a target depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural products (e.g., fertilizer) into the trench. The opener/seed tube may be followed by closing discs that move displaced soil back into the trench and/or a packer wheel that packs the soil on top of the deposited seeds.

In certain configurations, an air cart is used to meter and deliver flowable particulate material (e.g., agricultural product, such as seeds, fertilizer, etc.) to the row units of the seeding implement. The air cart generally includes a storage tank (e.g., a pressurized tank), an air source (e.g., a blower), and a metering assembly. The flowable particulate material is typically gravity fed from the storage tank to the metering assembly which distributes the flowable particulate material into an airflow generated by the air source. The airflow carries the flowable particulate material to the row units via conduits extending between the air cart and the seeding implement.

As the seeding implement follows a curved path through the field (e.g., during a turn), the row units positioned on the outside of the path have a higher ground speed than the row units position on the inside of the path. As a result, the row units positioned on the inside of the path deposit the flowable particulate material into the soil at a concentration (e.g., particles/mass per unit area) greater than a target concentration, and the row units positioned on the outside of the path deposit the flowable particulate material into the soil at a concentration lower than the target concentration. The resultant crop yield from seeds deposited within the soil at a concentration greater than the target concentration may be reduced due to increased competition for available resources among the plants of the crop. In addition, the area of the field may not be utilized efficiently if seeds are deposited within the soil at a concentration less than the target concentration, thereby reducing the total crop yield from the field (e.g., due to insufficient crop density and/or increased weed population).

BRIEF DESCRIPTION

In certain embodiments, a particulate material metering system for an agricultural implement includes a controller having a memory and a processor. The controller is configured to determine a radius of curvature of a path of a lead vehicle coupled to the agricultural implement. In addition, the controller is configured to determine a lead time of the lead vehicle relative to the agricultural implement based on a speed of the lead vehicle and/or the agricultural implement and a longitudinal offset distance between the lead vehicle and the agricultural implement. The controller is also configured to determine a radius of curvature of a path of the agricultural implement based on the radius of curvature of the path of the lead vehicle at a determination time, in which the determination time is a current time minus an offset time, and the offset time is based on the lead time. Furthermore, the controller is configured to determine target particulate material flow rates of respective metering devices of the particulate material metering system based on the radius of curvature of the path of the agricultural implement. The controller is also configured to output signals to the metering devices indicative of the target particulate material flow rates.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
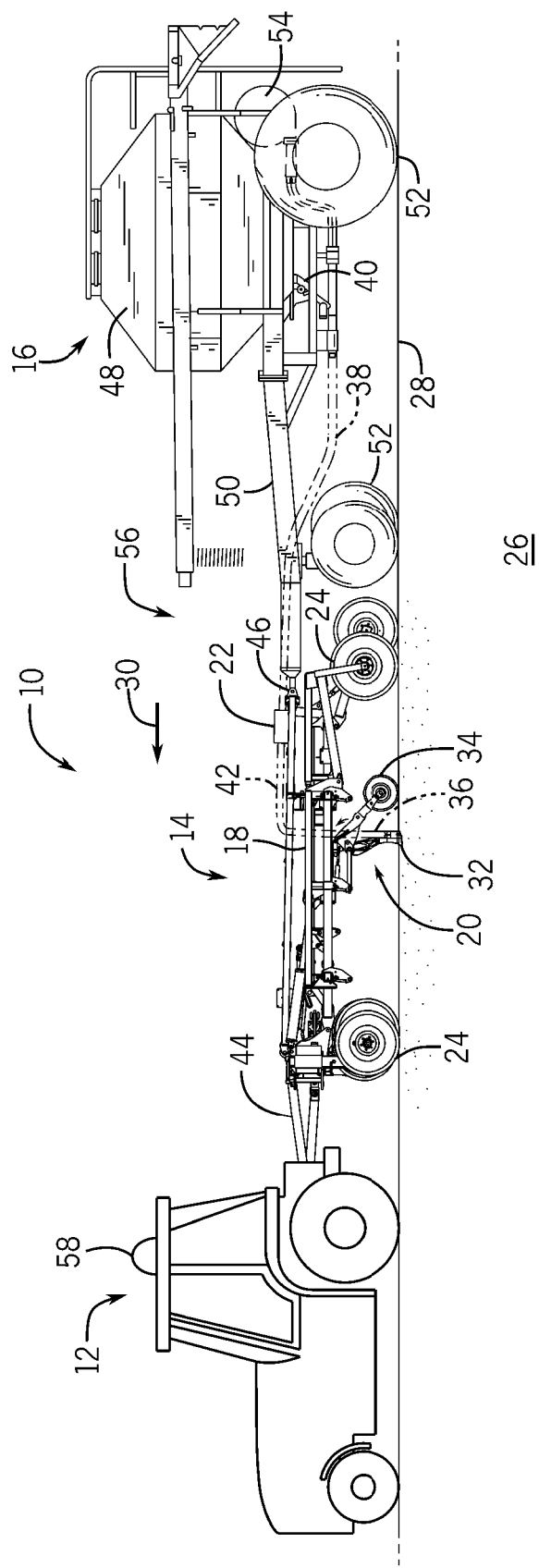
FIG. 1 is a side view of an embodiment of an agricultural system including a work vehicle, an agricultural implement, and an agricultural air cart.

FIG. 1 is a side view of an embodiment of an agricultural system 10 including a work vehicle 12, an agricultural implement 14, and an agricultural air cart 16. As depicted, the agricultural implement 14 includes a tool frame 18 coupled to a row unit 20 (e.g., ground engaging opener assembly), a particulate material distribution header 22, and wheel assemblies 24. The agricultural implement 14 is towed by the work vehicle 12 (e.g., a tractor) to deposit rows of particulate material within soil 26. The wheel assemblies 24 contact a surface 28 of the soil 26 to enable the agricultural implement 14 to be towed by the work vehicle 12 along a direction of travel 30. As the agricultural implement 14 is towed along the direction of travel 30, a row of particulate material may be deposited into the soil 26 by each row unit 20 (e.g., ground engaging opener assembly). Although only one row unit 20 is shown, the agricultural implement 14 may include multiple row units organized in one or more ranks across the agricultural implement 14. In some embodiments, the agricultural implement may include one or more ranks of twelve or more row units, which may each deposit a respective row of particulate material into the soil.

To facilitate depositing the particulate material into the soil 26, each row unit 20 (e.g., ground engaging opener assembly) includes an opener 32, a press wheel 34, and a particulate material tube 36. While the opener 32 engages the soil 26, the opener 32 exerts a force onto the soil that excavates a trench into the soil as the row unit 20 travels through the field along the direction of travel 30. The particulate material is deposited into the excavated trench via the particulate material tube 36. Then, the press wheel 34 packs soil onto the deposited particulate material. In certain embodiments, the press wheel of at least one row unit may be omitted. For example, at least one press wheel may be mounted to the frame of the agricultural implement behind the at least one row unit. In certain embodiments, the row unit may also include a residue manager, another suitable ground engaging tool, or a combination thereof. Furthermore, while the illustrated row unit includes an opener, in alternative embodiments at least one row unit on the agricultural implement may include an applicator assembly configured to deposit particulate material onto the surface of the field, or any other suitable type of material deposition assembly.

The header 22 is configured to provide the particulate material to the row units 20. In some embodiments, the header 22 may pneumatically distribute the particulate material from a primary line to secondary lines. For example, a primary line 38 may direct particulate material from the air cart 16 (e.g., a metering assembly 40 of the air cart 16) to the header 22. Additionally, the header 22 may distribute the particulate material to the row units 20 (e.g., to the particulate material tubes 36 of the row units) via respective secondary lines 42. For example, each secondary line 42 may be fluidly coupled to a respective particulate material tube 36 (e.g., the secondary line 42 may be integrally formed with the respective particulate material tube 36). In certain embodiments, multiple primary lines may direct particulate material to multiple headers. For example, the metering assembly 40 may include multiple metering devices, in which each metering device is connected to a respective primary line, and each metering device is configured to independently control flow of the particulate material to the respective primary line. In addition, multiple secondary lines may extend from each header to respective row units. Furthermore, in certain embodiments, at least one secondary line may extend to a secondary header, and multiple tertiary lines may extend from the secondary header to respective row units.

In the illustrated embodiment, the air cart 16 is towed behind the agricultural implement 14. For example, the agricultural implement 14 may be coupled to the work vehicle 12 by a first hitch assembly 44, and the air cart 16 may be coupled to the agricultural implement 14 by a second hitch assembly 46. However, in other embodiments, the agricultural implement may be towed behind the air cart. In further embodiments, the implement and the air cart may be part of a single unit that is towed behind the work vehicle.

The air cart 16 may centrally store particulate material and distribute the particulate material to the headers 22. In the illustrated embodiment, the air cart 16 includes a storage tank 48, a frame 50, wheels 52, and an air source 54. As illustrated, the towing hitch 46 is coupled between the tool frame 18 and the air cart frame 50, which enables the air cart 16 to be towed with the agricultural implement 14. Additionally, the storage tank 48 is configured to centrally store the particulate material. In some embodiments, the storage tank 48 may include multiple compartments for storing different types of particulate material. For example, a first compartment may store seeds while a second compartment may store a dry fertilizer. In such configurations, the air cart 16 may deliver both seeds and fertilizer to the implement 14 via separate distribution systems, or as a mixture through a single distribution system.

From the storage tank 48, the particulate material may be fed into the metering assembly 40, which meters the particulate material into an airflow provided by the air source 54. The airflow fluidizes the particulate material for distribution to the headers 22 via the primary lines 38. As depicted, the metering assembly 40 is mounted to the bottom of the storage tank 48. To facilitate distributing the particulate material, the airflow output by the air source 54 may be guided to the metering assembly 40 via a plenum and multiple pneumatic lines. In some embodiments, the air source 54 may include one or more pumps and/or blowers powered by electric or hydraulic motor(s), for example.

In certain embodiments (e.g., embodiments in which the air cart is towed behind the agricultural implement), the air source and/or the plenum may be mounted to a rear portion of the air cart (e.g., relative to the direction of travel 30). In other embodiments (e.g., embodiments in which the air cart is towed in front of the implement), the air source and/or the plenum may be mounted to a front portion of the air cart (e.g., relative to the direction of travel 30). Furthermore, in embodiments in which the air cart includes multiple distribution systems, multiple air sources and/or plenums may be utilized. For example, if the air cart includes two separate distribution systems for separately distributing seeds and fertilizer to the row units, the air cart may include two air sources and two plenums (e.g., one air source and one plenum for each distribution system). In embodiments in which the air cart includes a single distribution system (e.g., in which one or more particulate materials are metered from one or more metering assemblies into primary lines), a single air source and/or a single plenum may be utilized. In certain embodiments, multiple air sources and/or multiple plenums may provide an air flow to multiple groups of lines (e.g., one group of lines coupled to each plenum). In such embodiments, corresponding lines from each group may merge in the metering assembly, thereby establishing a combined flow to the implement.

In certain embodiments, the agricultural system 10 includes a particulate material metering system 56 configured to independently control the flow of the particulate material to individual row units 20 or groups of row units 20, such that each row unit 20 deposits the flowable particulate material at substantially a target concentration (e.g., particles/mass per area) within the soil as the agricultural implement follows a curved path through the field. As discussed in detail below, in certain embodiments, the particulate material metering system 56 includes a controller having a memory and a processor. The controller is configured to determine a radius of curvature of a path of the work vehicle 12 as the work vehicle 12 moves within the field. For example, the particulate material metering system 56 may include a spatial locating device 58 coupled to the work vehicle 12 and communicatively coupled to the controller. The spatial locating device 58 may be configured to output a signal indicative of the position and, in certain embodiments, the velocity of the work vehicle 12. Furthermore, in certain embodiments, the spatial locating device 58 may be configured to output a signal indicative of a course (e.g., course over ground) of the work vehicle 12. The controller may determine the radius of curvature of the path of the work vehicle 12 by determining a rate of change in the course of the work vehicle 12 (e.g., as provided by the spatial locating device 58 or as determined based on input from the spatial locating device 58).

As used herein, "position" refers to a position vector, such as a one, two, or three-dimensional position vector. For example, a two-dimensional position vector may include latitude and longitude, and a three-dimensional position vector may include latitude, longitude, and altitude/elevation (e.g., above a ground plane). The position vector may be represented in a rectangular, polar, cylindrical, or spherical coordinate system, among other suitable coordinate systems. In addition, as used herein, "velocity" refers to a velocity vector, such as a one, two, or three-dimensional velocity vector. For example, a one-dimensional velocity vector may include speed (e.g., ground speed), a two-dimensional velocity vector may include speed (e.g., ground speed) and heading within a plane (e.g., along a ground plane), and a three-dimensional velocity vector may include speed and heading within a three-dimensional space. The velocity vector may be represented in a rectangular, polar, cylindrical, or spherical coordinate system, among other suitable coordinate systems. In certain embodiments, the velocity may be represented as a unit/normalized vector, i.e., a vector having a unit magnitude. In such embodiments, the magnitude (e.g., speed) is not included in the velocity vector. For example, a two-dimensional velocity unit vector may be representative of heading within a plane (e.g., along a ground plane), and a three-dimensional velocity unit vector may be representative of heading within a three-dimensional space.

The controller may also be configured to determine a lead time of the work vehicle 12 relative to the agricultural implement 14 based on a speed of the work vehicle 12 and/or the agricultural implement 14 and a longitudinal offset distance between the work vehicle and the agricultural implement. For example, as the speed of the work vehicle/ agricultural implement increases, the lead time may be reduced, and as the speed of the work vehicle/agricultural implement decreases, the lead time may be increased. The controller may determine a radius of curvature of a path of the agricultural implement based on the radius of curvature of the path of the work vehicle at a determine time. The determination time is the current time minus an offset time, and the offset time is based on the lead time. For example, the offset time may be equal to the lead time, or the offset time may be equal to the lead time minus a propagation delay time, in which the propagation delay time is a time sufficient for particulate material to flow from metering devices of the metering assembly 40 to corresponding row units 20 of the agricultural implement 14. Furthermore, the controller is configured to determine multiple target particulate material flow rates of the respective metering devices based on the radius of curvature of the path of the agricultural implement 14. The controller is configured to output signals to the metering devices indicative of the target particulate material flow rates, thereby causing the row units to output the particulate material at the respective target rates. For example, the slower row units positioned on the inside of the path may deposit particulate material at a lower rate, and the faster row units positioned on the outside of the path may deposit particulate material at a higher rate. By controlling the flow rate of the metering devices based on the radius of curvature of the agricultural implement path, each row unit may deposit particulate material within the soil at a concentration substantially equal to a target concentration, thereby enhancing yield from resulting crops (e.g., as compared to metering systems that do not compensate for the curved path of the agricultural implement).

Figure 2:
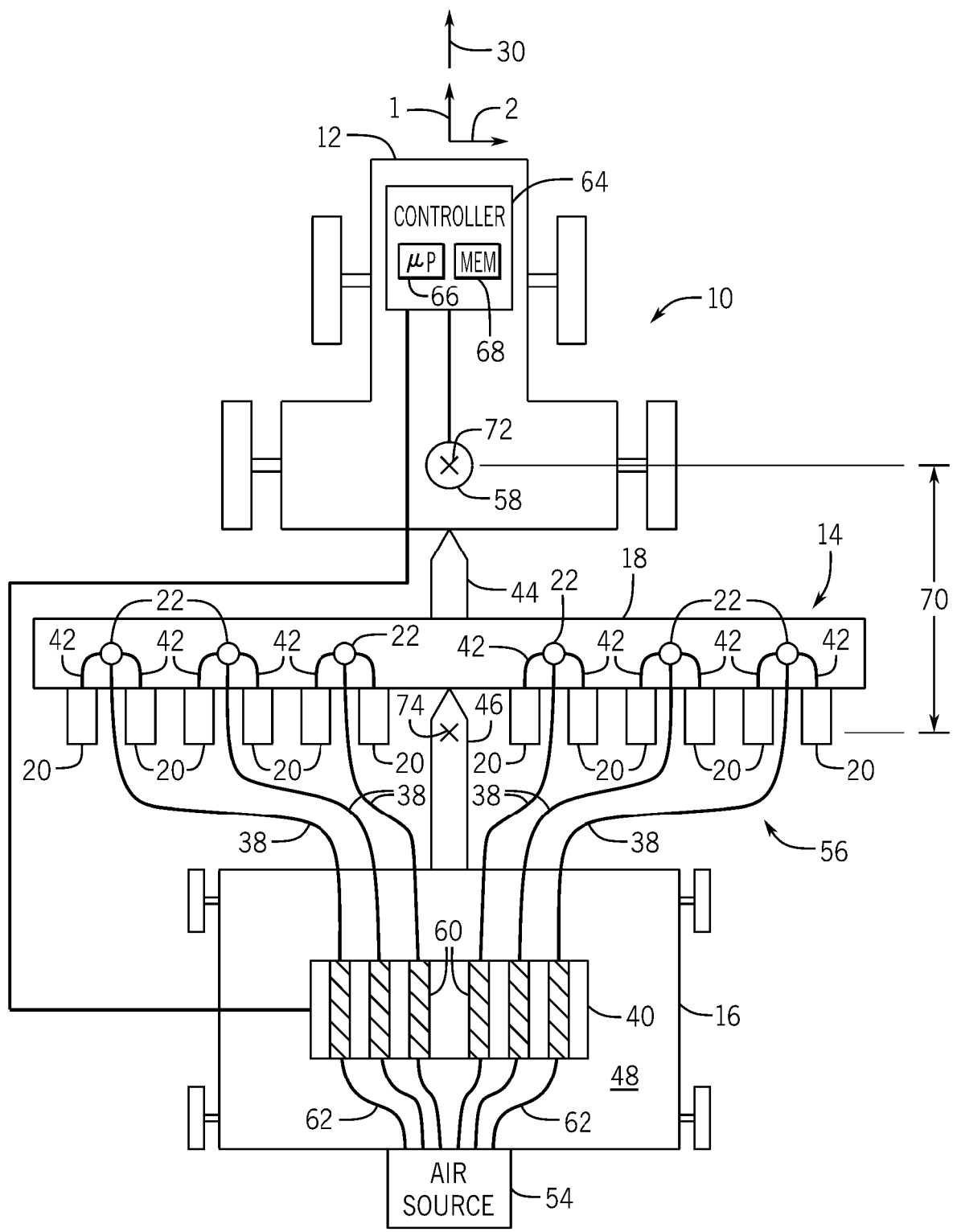
FIG. 2 is a schematic top view of the agricultural system of FIG. 1, including the work vehicle, the agricultural implement, and the agricultural air cart.

FIG. 2 is a schematic top view of the agricultural system 10 of FIG. 1, including the work vehicle 12, the agricultural implement 14, and the agricultural air cart 16. In the illustrated embodiment, the metering assembly 40 of the metering system 56 includes multiple metering devices 60. In certain embodiments, each metering device 60 includes a meter roller and a motor (e.g., electric motor) configured to drive the meter roller in rotation. As illustrated, each metering device 60 is fluidly coupled to the air source 54 by a respective pneumatic conduit 62 (e.g., extending from a plenum fluidly coupled to the air source 54). The metering device 60 is configured to receive a flow of air from the air source 54 and meter the flowable particulate material into the flow of air, thereby establishing a particulate material/air mixture that flows through the respective primary line 38 to the respective header 22. As previously discussed, the particulate material flows from each header 22 to respective row units 20 via respective secondary lines 42. In the illustrated embodiment, two row units 20 are fluidly coupled to each header 22 via respective secondary lines 42. However, in other embodiments, more or fewer row units (e.g., 1, 2, 3, 4, 5, 6, 7, 8, or more) may be fluidly coupled to at least one of the headers. In the illustrated embodiment, the metering assembly 40 includes six metering devices 60. However, in other embodiments, the metering assembly may include more or fewer metering devices (e.g., 1, 2, 3, 4, 5, 6, 7, 8, 9, 10, 11, 12, or more).

In the illustrated embodiment, each metering device 60 is individually controllable. Accordingly, the flow rate of particulate material to each header/group of row units fluidly coupled to the header may be individually controlled. For example, in embodiments in which the metering device includes a meter roller and a motor configured to drive the meter roller to rotate, the flow rate of the particulate material from the metering device may be controlled by controlling the rotation rate of the motor (e.g., including stopping the motor to block flow of the particulate material to the respective group of row units). In the illustrated embodiment, each metering device 60 is communicatively coupled to a controller 64. As discussed in detail below, the controller 64 is configured to control the flow rate of particulate material through each metering device 60. In the illustrated embodiment, the controller 64 is an element of the particulate material metering system 56 and is located in/on the work vehicle 12. However, in other embodiments, the controller may be located in/on the air cart 16 or the agricultural implement 14. Furthermore, in certain embodiments, functions of the controller may be distributed between multiple controllers in one or more locations.

In certain embodiments, the controller 64 is an electronic controller having electrical circuitry configured to control metering devices 60. In the illustrated embodiment, the controller 64 includes a processor, such as the illustrated microprocessor 66, and a memory device 68. The controller 64 may also include one or more storage devices and/or other suitable components. The processor 66 may be used to execute software, such as software for controlling the metering devices, and so forth. Moreover, the processor 66 may include multiple microprocessors, one or more "general-purpose" microprocessors, one or more special-purpose microprocessors, and/or one or more application specific integrated circuits (ASICS), or some combination thereof. For example, the processor 66 may include one or more reduced instruction set (RISC) processors.

The memory device 68 may include a volatile memory, such as random access memory (RAM), and/or a nonvolatile memory, such as read-only memory (ROM). The memory device 68 may store a variety of information and may be used for various purposes. For example, the memory device 68 may store processor-executable instructions (e.g., firmware or software) for the processor 66 to execute, such as instructions for controlling the metering devices, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the metering devices, etc.), and any other suitable data.

In the illustrated embodiment, the spatial locating device 58, which is mounted/coupled to the work vehicle 12, is communicatively coupled to the controller 64. As previously discussed, the spatial locating device 58 is configured to output a signal indicative of a position and, in certain embodiments, a velocity of the work vehicle 12. Furthermore, in certain embodiments, the spatial locating device 58 may be configured to output a signal indicative of a course (e.g., course over ground) of the work vehicle 12. The spatial locating device may include any suitable system configured to measure the position, and in certain embodiments velocity and/or course, of the work vehicle, such as a global positioning system (GPS), for example. In certain embodiments, the spatial locating device 58 may be configured to measure the position/velocity/course of the work vehicle relative to a fixed point within a field (e.g., via a fixed radio transceiver). Accordingly, the spatial locating device 58 may be configured to measure the position/velocity/course of the work vehicle relative to a fixed global coordinate system (e.g., via the GPS) or a fixed local coordinate system.

The controller 64 of the particulate material metering system 56 is configured to individually control the flow of the particulate material through the metering devices 60, such that each row unit 20 deposits the flowable particulate material substantially at a target concentration within the soil as the agricultural implement 14 follows a curved path through the field. First, the controller 64 determines a radius of curvature of a path of the work vehicle 12 (e.g., lead vehicle) through the field. As discussed in detail below, the controller 64 may determine a course of the work vehicle 12 through the field based on input from the spatial locating device 58. The controller 64 may then determine a rate of change in the course and determine the radius of curvature of the path of the work vehicle based on the rate of change.

Next, the controller 64 determines a lead time of the work vehicle 12 relative to the agricultural implement 14 based on a speed of the work vehicle 12 and/or the agricultural implement 14 (e.g., speed of the work vehicle alone, speed of the agricultural implement alone, average speed of the work vehicle and the agricultural implement, etc.) and a longitudinal offset distance 70 between the work vehicle 12 and the agricultural implement 14. As used herein, "lead time" refers to a duration sufficient for the agricultural system 10 to traverse a distance along the field equal to the longitudinal offset distance 70. Furthermore, as used herein, "longitudinal offset distance" refers to a distance (e.g., distance along a longitudinal axis 1 of the agricultural system 10 while the agricultural system is moving in a straight line) between a reference point 72 on the lead vehicle (e.g., work vehicle 12) and a reference point 74 on the agricultural implement 14. The reference point 72 on the work vehicle 12 represents the position of the work vehicle 12 in space (e.g., within the field). In the illustrated embodiment, the reference point 72 on the work vehicle 12 corresponds to the position of the spatial locating device 58 (e.g., the antenna of the spatial locating device). However, in other embodiments, the work vehicle reference point may be positioned in another suitable location. The reference point 74 on the agricultural implement 14 corresponds to the position along the longitudinal axis 1 where the flowable particulate material is deposited within the soil. The lateral positions (e.g., positions along a lateral axis 2 of the agricultural system 10 while the agricultural system is moving in a straight line) where the flowable particulate material is disposed within the soil correspond to the lateral positions of the openers of row units 20. The longitudinal offset distance 70 may be manually entered via a user interface communicatively coupled to the controller, stored within a storage device of the controller (e.g., and loaded in response to manual/automatic identification of agricultural implement), received from an external source (e.g., remote operating station), or determined based on one or more inputs (e.g., agricultural implement type, location of the spatial locating device antenna on the work vehicle, length of the hitch, etc.). Furthermore, a signal indicative of the speed of the work vehicle 12/agricultural implement 14 may be received from the spatial locating device 58 and/or a spatial locating device positioned on the agricultural implement, or the speed of the work vehicle 12/agricultural implement 14 may be determined by the controller 64 based on input (e.g., position information) from the spatial locating device(s).

After determining the lead time, the controller 64 determines a radius of curvature of the path of the agricultural implement 14 based on the radius of curvature of the path of the work vehicle 12 at a determination time. The determination time is the current time minus an offset time, and the offset time is based on the lead time. In certain embodiments, the offset time may equal the lead time. For example, if the lead time is five seconds, the determination time is five seconds before the current time. As such, the radius of curvature of the path of the agricultural implement 14 is determined based on the radius of curvature of the path of the work vehicle 12 five seconds before the current time. Accordingly, the radius of curvature of the path of the agricultural implement is determined at substantially the same location within the field as the radius of curvature of the path of the work vehicle that is used to determine the radius of curvature of the path of the agricultural implement.

In certain embodiments, the radius of curvature of the path of the agricultural implement 14 is determined by multiplying the radius of curvature of the path of the work vehicle at the determination time by a scale factor. The scale factor compensates for the difference between the path of the work vehicle and the path of the agricultural implement. For example, if the work vehicle 12 makes a wide turn (e.g., the path of the work vehicle has a larger radius of curvature), the path of the agricultural implement 14 may substantially match the path of the work vehicle 12. Accordingly, the scale factor may be set to 1, such that the radius of curvature of the path of the agricultural implement 14 equals the radius of curvature of the path of the work vehicle 12 at the determination time. However, if the work vehicle 12 makes a tight turn (e.g., the path of the work vehicle has a smaller radius of curvature), the path of the agricultural implement 14 may have a larger radius of curvature than the path of the work vehicle 12. Accordingly, the scale factor may be greater than 1, such that the radius of curvature of the path of the agricultural implement 14 is greater than the radius of curvature of the path of the work vehicle 12 at the determination time.

While a scale factor that increases from 1 as the radius of curvature of the path of the work vehicle decreases is disclosed above, another suitable scale factor may be utilized in other embodiments. In addition, while adjusting the scale factor based on the radius of curvature of the path of the work vehicle is disclosed above, in certain embodiments, the scale factor may be adjusted based on other factors (e.g., in addition to the radius of curvature of the path of the work vehicle). For example, the scale factor may be at least partially based on the type of work vehicle coupled to the agricultural implement (e.g., whether the work vehicle is an articulated tractor or a steered tractor, etc.). The scale factor may also be at least partially based on the position of the agricultural implement relative to the work vehicle (e.g., whether the air cart is positioned between the agricultural implement and the work vehicle, or the agricultural implement is directly coupled to the work vehicle, as illustrated, etc.). Furthermore, in certain embodiments, the step of multiplying the radius of curvature of the path of the work vehicle at the determination time by the scale factor may be omitted. In addition, in certain embodiments, the controller may utilize other suitable techniques (e.g., a lookup table, an empirical formula, etc.) to determine the radius of curvature of the agricultural implement based on the radius of curvature of the work vehicle at the determination time.

In certain embodiments, the offset time is equal to the lead time minus a propagation delay time. As used herein, "propagation delay time" is a time sufficient for the particulate material to flow from the metering devices 60 to the corresponding row units 20. In certain embodiments, the time sufficient for the particulate material to flow from a first metering device to a first group of row units is different than the time sufficient for the particulate material to flow from a second metering device to a second group of row units (e.g., due to a variation in length of the primary lines, a variation in length of the secondary lines, air/particle speed through the lines, etc.). In such embodiments, the propagation delay time may be the average time sufficient for the particulate material to flow from the metering devices to the corresponding row units. By way of example, the propagation delay time may be three seconds and the lead time may be five seconds, thereby establishing an offset time of two seconds. As such, the determination time is two seconds before the current time. Therefore, the radius of curvature of the path of the agricultural implement 14 is determined based on the radius of curvature of the path of the work vehicle 12 two seconds before the current time. Accordingly, the radius of curvature of the path of the agricultural implement is determined at the time the particulate material reaches the row units and is deposited within the soil, thereby establishing a target concentration of the particulate material within the soil. In certain embodiments and/or operating conditions, the propagation delay time is greater than or equal to the lead time. In such embodiments/operating conditions, the offset time may be set to zero to reduce the difference between the radius of curvature of the path of the agricultural implement used to determine the target particulate material flow rates and the radius of curvature of the path of the agricultural implement at the time the particulate material is disposed within the soil at the target particulate material flow rates. In certain embodiments, the radius of curvature of the path of the agricultural implement is determined by multiplying the radius of curvature of the path of the work vehicle at the determination time, which is based on the propagation delay time, by a scale factor.

After determining the radius of curvature of the path of the agricultural implement, the controller 64 determines target particulate material flow rates of the metering devices 60 (e.g., one target particulate material flow rate for each metering device 60) based on the radius of curvature of the path of the agricultural implement 14 (e.g., such that each row unit 20 deposits the flowable particulate material at substantially a target concentration within the soil). The controller 64 then outputs signals to the metering devices 60 indicative of the target particulate material flow rates. In certain embodiments, the target particulate material flow rates are determined such that the particulate material flow rates through the row units 20 vary substantially linearly along a lateral axis of the agricultural implement 14 (e.g., the lateral axis of the agricultural implement corresponds to the lateral axis 2 of the agricultural system 10 while the agricultural system is moving in a straight line). As used herein, "substantially linearly" refers to a substantially linear variation among single representative row units from the groups of row units. As previously discussed, each group of row units receives particulate material from a common header and may include 1, 2, 3, 4, 5, 6, or more row units. Accordingly, if each group of row units includes multiple row units, the target particulate material flow rates are determined such that the particulate material flow rates through the groups of row units vary substantially linearly along the lateral axis of the agricultural implement. While a substantially linear variation among the row units is disclosed above, in other embodiments, the target particulate material flow rates may be determined such that the particulate material flow rates through the row units vary in another suitable relationship (e.g., hyperbolic, parabolic, exponential, etc.) along the lateral axis of the agricultural implement.

In certain embodiments, each target particulate material flow rate is determined by multiplying a straight line target particulate material flow rate by a respective compensation factor. For example, each compensation factor may be determined such that the particulate material flow rates through the row units 20 vary substantially linearly along a lateral axis of the agricultural implement 14. The straight line target particulate material flow rate is the target particulate material flow rate from each metering device while the agricultural implement is moving in a straight line (e.g., no curve compensation). The straight line target particulate material flow rate may be determined based on a target concentration of the particulate material within the soil, which, in turn, may be based on a yield map of the field, soil properties (e.g., moisture, organic material content, density, etc.) within the field, crop type, other suitable factor(s), or a combination thereof. In certain embodiments, the straight line target particulate material flow rate may be different for each metering device (e.g., to provide a target concentration of the particulate material to each portion of the field). While utilizing compensation factors to determine the target particulate material flow rates is disclosed above, in other embodiments, other suitable techniques may be utilized to determine the target particulate material flow rates (e.g., empirical formula, table, etc.).

In certain embodiments, determining the target particulate material flow rates of the metering devices based on the radius of curvature of the agricultural implement includes limiting each target particulate material flow rate to a threshold target particulate material flow rate range (e.g., by limiting the respective compensation factor). For example, the motors of the metering devices may be limited to a maximum rotation speed (e.g., due to physical and/or electrical limitations of the motor). In addition, if the flow rate of the particulate material through a primary and/or secondary line exceeds a threshold flow rate, the primary and/or secondary line may become plugged with the particulate material. Accordingly, if the target particulate material flow rate from a metering device is greater than a maximum particulate material flow rate from the metering device (e.g., due to the maximum rotation speed limit of the motor, the threshold particulate material flow rate through the respective primary/secondary lines, etc.), the controller may set the target particulate material flow rate from the metering device to the maximum particulate material flow rate from the metering device (e.g., by adjusting the respective compensation factor). Furthermore, the motors of the metering devices may be limited to a minimum rotation speed (e.g., due to physical and/or electrical limitations of the motor). In addition, if the flow rate of the particulate material through the row units is below a threshold value, the airflow, which conveys the particulate material to the row units, may drive a portion of the particulate material out of the trenches within the soil, thereby reducing yield. Accordingly, if the target particulate material flow rate from a metering device is less than a minimum particulate material flow rate from the metering device (e.g., due to the minimum rotation speed limit of the motor, the possibility of seeds being driven out of the trenches by the airflow, etc.), the controller may set the target particulate material flow rate from the metering device to the minimum particulate material flow rate from the metering device (e.g., by adjusting the respective compensation factor).

In certain embodiments, the maximum particulate material flow rate may be 20 percent greater than the straight line target particulate material flow rate, and the minimum particulate material flow rate may be 20 percent less than the straight line target particulate material flow rate. In further embodiments, the maximum particulate material flow rate may be 5 percent, 10 percent, 15 percent, 25 percent, or another suitable percentage greater than the straight line target particulate material flow rate, and/or the minimum particulate material flow rate may be 5 percent, 10 percent, 15 percent, 25 percent, or another suitable percentage less than the straight line target particulate material flow rate. For example, a lower maximum/minimum percentage (e.g., 10 percent) may be utilized while the metering device is outputting the flowable particulate material at a higher mass flow rate, and a higher maximum/minimum percentage (e.g., 20 percent) may be utilized while the metering device is outputting the flowable particulate material at a lower mass flow rate. While the minimum and maximum particulate material flow rates are disclosed above as a percentage of the straight line target particulate material flow rate, in certain embodiments, the minimum and/or maximum particulate material flow rate may be represented as a numerical value (e.g., pounds per minute) or a percentage of another suitable flow rate. Furthermore, while the controller may limit the target particulate material flow rate based on the minimum particulate material flow rate and the maximum particulate material flow rate in the illustrated embodiment, in other embodiments, the target particulate material flow rate may not be limited by at least one of the minimum particulate material flow rate and the maximum particulate material flow rate.

As previously discussed, the airflow that coveys the particulate material to the row units may drive a portion of the particulate material out of the trenches if the flow rate of the particulate material through the row units is below a threshold value. In addition, the primary and/or secondary line(s) may become plugged if the flow rate of the particulate material through the line(s) exceeds a threshold flow rate. In certain embodiments, the flow rate of the air through each pneumatic conduit may be adjusted (e.g., via a valve coupled to each respective pneumatic conduit). In such embodiments, the flow rate of the air may be reduced as the flow rate of the particulate material through respective row units is reduced. Accordingly, the minimum particulate material flow rate may not be based on the possibility of seeds being driven out of the trenches by the airflow. Furthermore, the flow rate of the air may be increased as the flow rate of the particulate material through the respective primary line and the respective second line(s) increases, thereby substantially reducing or eliminating the possibility of plugging within the line(s). Accordingly, the maximum particulate material flow rate may not be based on the possibility of plugging of the line(s).

While the radius of curvature of the path of the agricultural implement is determined based on the radius of curvature of the path of the work vehicle in the embodiments disclosed herein, in other embodiments, the radius of curvature of the path of the agricultural implement may be determined based on the radius of curvature of the path of another suitable lead vehicle. For example, in certain embodiments, the air cart may be positioned between the work vehicle and the agricultural implement. In such embodiments, a spatial locating device may be coupled to the air cart, and the controller may determine the radius of curvature of the path of the air cart based on feedback from the spatial locating device. In addition, the controller may determine the radius of curvature of the path of the agricultural implement based on the radius of curvature of the path of the air cart at the determination time.

In other embodiments, the radius of curvature of the path of the agricultural implement may be determined by another technique. For example, in certain embodiments, the radius of curvature of the agricultural implement may be determined based on feedback from one or more sensors (e.g., optical sensor(s), infrared sensor(s), ultrasonic sensor(s), radio frequency sensor(s), etc.) configured to monitor the position/angle of the agricultural implement relative to the work vehicle, based on feedback from one or more ground speed sensors (e.g., wheel rotational speed sensor(s), etc.) distributed across the width of the implement (e.g., at one or more row units, etc.), based on feedback from one or more spatial locating devices mounted on the agricultural implement, or a combination thereof. However, determining the radius of curvature of the path of the agricultural implement in this manner may not enable the controller to accurately determine a future radius of curvature of the path of the agricultural implement. As previously discussed, accurately determining the future radius of curvature of the path of the agricultural implement enables the controller to compensate for the particulate material propagation delay. In addition, while the illustrated agricultural system 10 includes an air cart 16 separate from the agricultural implement 14, in other embodiments, the air cart may be omitted, and the storage tank, the metering assembly, and the air source may be coupled to the frame of the agricultural implement.

Figure 3:
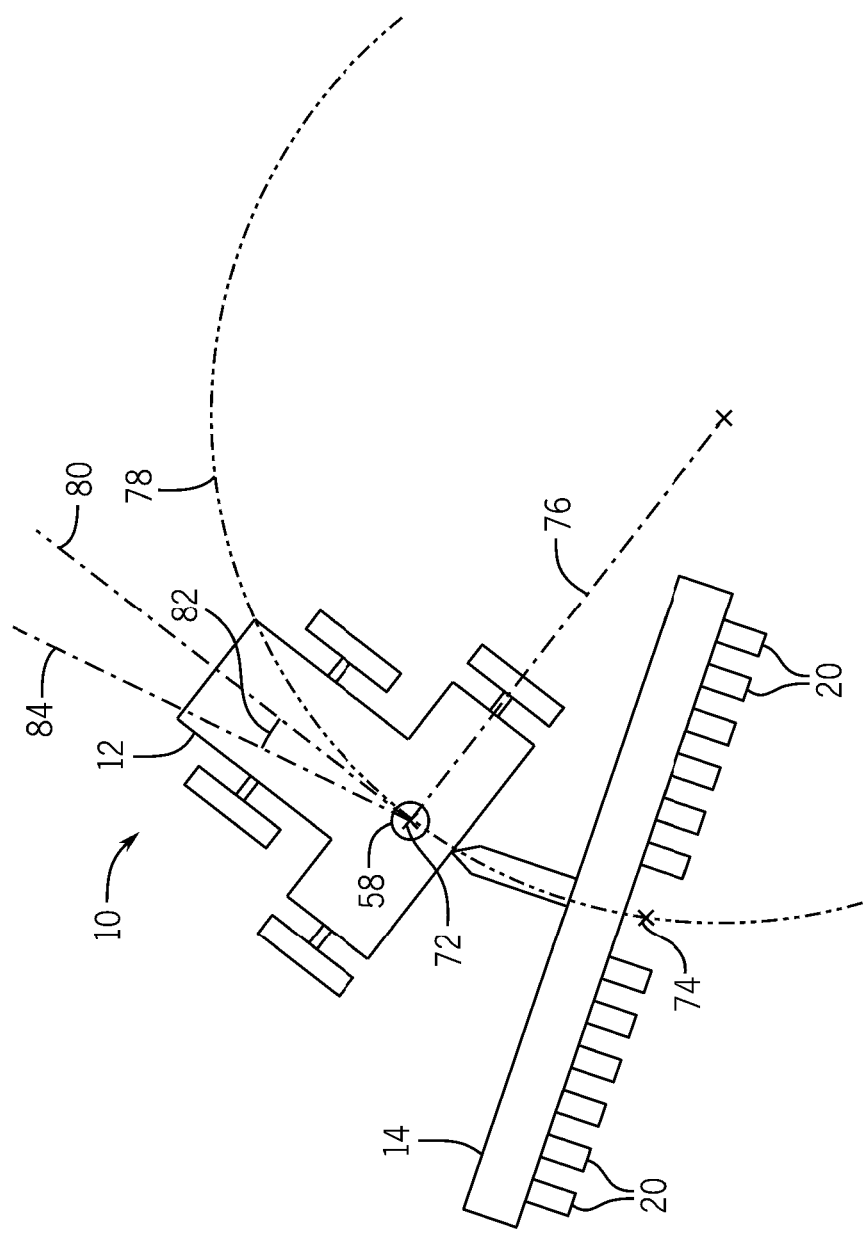
FIG. 3 is a schematic top view of an embodiment of an agricultural system, which includes a work vehicle and an agricultural implement, during a turn.

FIG. 3 is a schematic top view of an embodiment of an agricultural system 10, which includes a work vehicle 12 and an agricultural implement 14, during a turn. The air cart is removed for clarity, but may be included within the agricultural system. As previously discussed, the controller determines a radius of curvature 76 of a path 78 of the work vehicle 12 through the field. In certain embodiments, the controller determines a course 80 of the work vehicle 12 through the field based on input (e.g., position information, velocity information, etc.) from the spatial locating device 58 and/or other suitable sensors (e.g., ground speed sensor, etc.). In other embodiments, the controller receives the course 80 (e.g., course over ground) from the spatial locating device 58. The controller then determines a rate of change in the course (e.g., the rate of change in an angle 82 between an initial course 84 and the current course 80) and determines the radius of curvature of the path 78 of the work vehicle based on the rate of change.

As previously discussed, a lead time of the work vehicle 12 relative to the agricultural implement 14 is then determined based on a speed of the work vehicle/agricultural implement and a longitudinal offset distance between the work vehicle and the agricultural implement. The radius of curvature of the path of the agricultural implement 14 is determined based on the radius of curvature 76 of the path 78 of the work vehicle 12 at the determination time, which is the current time minus the offset time, and the offset time is based on the lead time. Once the radius of curvature of the path of the agricultural implement 14 is determined, the target particulate material flow rates of the metering devices are determined based on the radius of curvature of the path of the agricultural implement 14, and signals are output to the metering devices indicative of the target particulate material flow rates.

Figure 4:
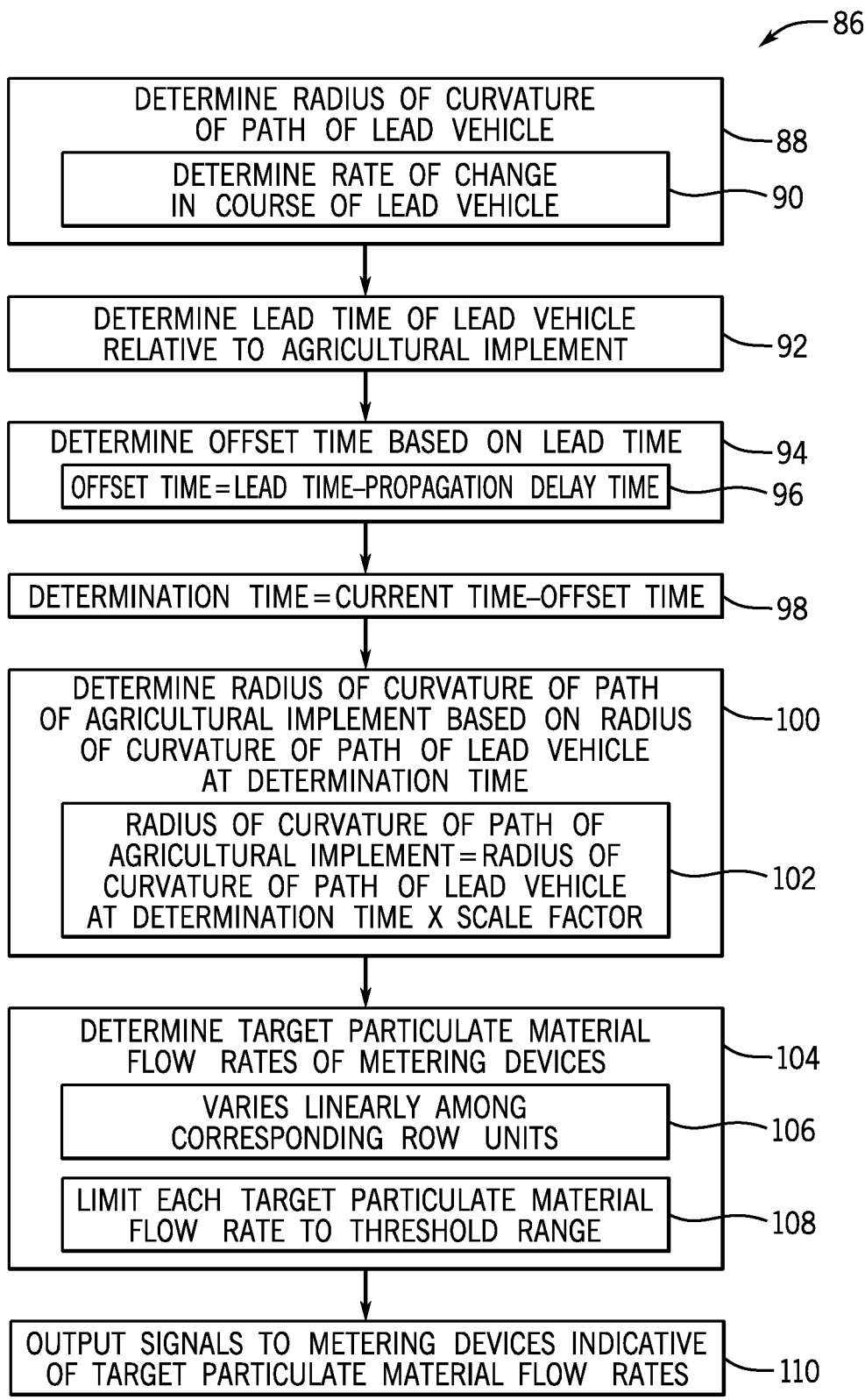
FIG. 4 is a flow diagram of an embodiment of a method for controlling a particulate material metering system.

FIG. 4 is a flow diagram of an embodiment of a method 86 for controlling a particulate material metering system. First, as represented by block 88, a radius of curvature of a path of a work vehicle is determined. As previously discussed, the radius of curvature of the path of the work vehicle may be determined by determining a rate of change in the course of the work vehicle and determining the radius of curvature of the path of the work vehicle based on the rate of change, as represented by block 90. However, in other embodiments, the radius of curvature of the path of the work vehicle may be determined by another suitable technique. Next, as represented by block 92, a lead time of the work vehicle relative to an agricultural implement towed by the work vehicle is determined based on a speed of the work vehicle and/or the agricultural implement and a longitudinal offset distance between the work vehicle and the agricultural implement. As previously discussed, lead time refers to a duration sufficient for the agricultural system to traverse a distance along the field equal to the longitudinal offset distance between a reference point on the work vehicle and a reference point on the agricultural implement.

After the lead time is determined, an offset time is determined based on the lead time, as represented by block 94. For example, in certain embodiments, the offset time may be equal to the lead time. In other embodiments, the offset time may be equal to the lead time minus a propagation delay time, as represented by block 96. As previously discussed, the propagation delay time is a time sufficient for the particulate material to flow from the metering devices to the corresponding row units. After the offset time is determined, a determination time is determined by subtracting the offset time from the current time, as represented by block 98.

Next, as represented by block 100, a radius of curvature of a path of the agricultural implement is determined based on the radius of curvature of the path of the work vehicle at the determination time. In certain embodiments, the radius of curvature of the path of the agricultural implement is determined by multiplying the radius of curvature of the path of the work vehicle by a scale factor, as represented by block 102. For example, the scale factor may increase from 1 as the radius of curvature of the path of the work vehicle decreases. In other embodiments, other suitable techniques (e.g., a lookup table, an empirical formula, etc.) may be utilized to determine the radius of curvature of the agricultural implement based on the radius of curvature of the work vehicle at the determination time.

As represented by block 104, target particulate material flow rates of metering devices are determined based on the radius of curvature of the path of the agricultural implement. In certain embodiments, the target particulate material flow rates of the metering devices are determined such that the target particulate material flow rates vary substantially linearly among corresponding row units along a lateral axis of the agricultural implement, as represented by block 106. However, in other embodiments, the target particulate material flow rates may be determined such that the flow rates vary non-linearly among the corresponding row units along the lateral axis of the agricultural implement. Furthermore, in certain embodiments, each target particulate material flow rate may be limited to a threshold target particulate material flow rate range (e.g., due to the maximum rotation speed limit of the motor, the threshold particulate material flow rate through the primary/secondary lines, the minimum rotation speed limit of the motor, the possibility of seeds being driven out of the trench by the airflow, etc.), as represented by block 108. Once the target particulate material flow rates are determined, signals indicative of the target particulate material flow rates are output to the metering devices, as represented by block 110.

The method 86 disclosed above may be performed by any suitable device or combination of devices, such as the controller described above with reference to FIG. 2. For example, the steps of the method 86 may be stored within the memory device of the controller and executed by the processor of the controller. Furthermore, in certain embodiments, the steps of the method 86 may be performed in the order disclosed above. However, in other embodiments, the steps of the method may be performed in any other suitable order (e.g., including performing certain steps concurrently). In addition, while one method of controlling a particulate material metering system is disclosed herein, the particulate material metering system disclosed above with reference FIGS. 2-3 may be controlled according to another suitable method.

Figure 5:
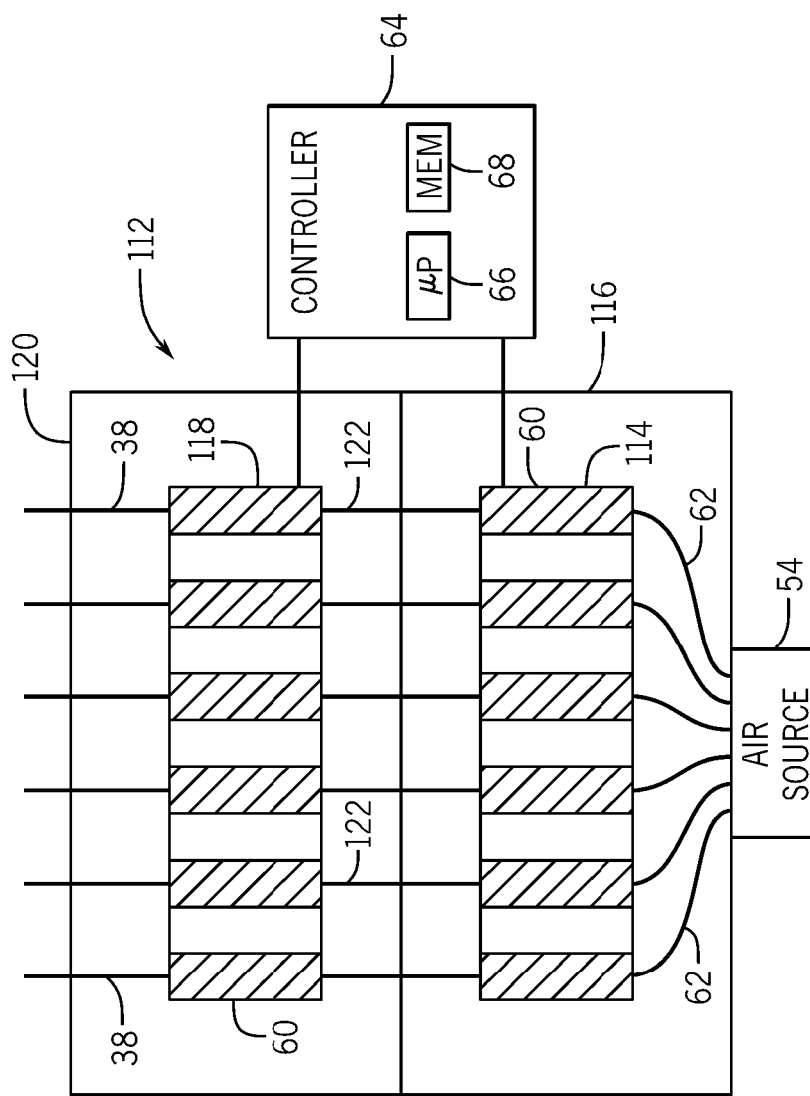
FIG. 5 is a schematic top view of a portion of an embodiment of a particulate material metering system.

FIG. 5 is a schematic top view of a portion of an embodiment of a particulate material metering system 112. In the illustrated embodiment, the particulate material metering system 112 includes a first metering assembly 114 configured to receive flowable particulate material from a first storage tank 116 and a second metering assembly 118 configured to receive flowable particulate material from a second storage tank 120. Each storage tank may store a different type of flowable particulate material. For example, the first storage tank 116 may store seed, and the second storage tank 120 may store fertilizer. As discussed in detail below, the particulate material metering system 112 is configured to meter both particulate materials into the primary lines, thereby providing the row units with a mixture of the particulate materials.

As illustrated, each metering assembly includes multiple metering devices 60. Each metering device 60 of the first metering assembly 114 is fluidly coupled to the air source 54 by a respective pneumatic conduit 62 (e.g., extending from a plenum coupled to the air source 54). The metering device 60 of the first metering assembly 114 is configured to receive a flow of air from the air source 54 and meter the flowable particulate material from the first tank 116 into the flow of air, thereby establishing a particulate material/air mixture that flows through a respective intermediate line 122. Each metering device 60 of the second metering assembly 118 is fluidly coupled to a respective intermediate line 122. The metering device 60 of the second metering assembly 118 is configured to receive the particulate material/air flow from a respective metering device 60 of the first metering assembly 114 and meter the flowable particulate material from the second tank 120 into the particulate material/air flow, thereby establishing a mixture of both particulate materials and air that flows through a respective primary line 38 to a respective header. As previously discussed, the particulate material flows from each header to respective row units via respective secondary lines. In the illustrated embodiment, each metering assembly includes six metering devices 60. However, in other embodiments, at least one metering assembly may include more or fewer metering devices (e.g., 1, 2, 3, 4, 5, 6, 7, 8, 9, 10, 11, 12, or more).

As previously discussed, the target flow rate from each metering device 60 may be limited to a threshold target particulate material flow rate range. For example, the compensation factor for each metering device may be adjusted such that the target particulate material flow rate for the metering device is within the threshold target particulate material flow rate range. By way of example, a set of first compensation factors may be determined for the first metering devices 60 of the first metering assembly 114 based on the radius of curvature of the path of the agricultural implement (e.g., which may be determined based on the radius of curvature of the path of the work vehicle or based on sensor/implement-mounted spatial locating device feedback). As previously discussed, the target particulate material flow rate for each first metering device may be determined by multiplying the respective first compensation factor by a first straight line target particulate material flow rate. In addition, each first compensation factor may be reduced such that a respective first target particulate material flow rate associated with a respective first metering device is equal to a first upper threshold target particulate material flow rate in response to the respective first target particulate material flow rate being above the first upper threshold target particulate material flow rate. Each first compensation factor may also be increased such that a respective first target particulate material flow rate associated with a respective first metering device is equal to a first lower threshold target particulate material flow rate in response to the respective first target particulate material flow rate being below the first lower threshold target particulate material flow rate. Accordingly, the controller may set the target particulate material flow rate from each first metering device to a value within the threshold range (e.g., corresponding to the first upper threshold target particulate material flow rate and the first lower threshold target particulate material flow rate) such that the particulate material flow rate from the first metering device does not exceed a maximum particulate material flow rate (e.g., due to the maximum rotation speed limit of the motor, the threshold particulate material flow rate through the respective primary/secondary lines, etc.) or fall below a minimum particulate material flow rate (e.g., due to the minimum rotation speed limit of the motor, the possibility of seeds being driven out of the trench by the airflow, etc.). As previously discussed, the threshold range may be based on mass flow rate of the particulate material through the metering device.

Furthermore, a set of second compensation factors may be determined for the second metering devices 60 of the second metering assembly 118 based on the radius of curvature of the path of the agricultural implement (e.g., which may be determined based on the radius of curvature of the path of the work vehicle or based on sensor/implement-mounted spatial locating device feedback). As previously discussed, the target particulate material flow rate for each second metering device may be determined by multiplying the respective second compensation factor by a second straight line target particulate material flow rate. In addition, each second compensation factor may be reduced such that a respective second target particulate material flow rate associated with a respective second metering device is equal to a second upper threshold target particulate material flow rate in response to the respective second target particulate material flow rate being above the second upper threshold target particulate material flow rate. Each second compensation factor may also be increased such that a respective second target particulate material flow rate associated with a respective second metering device is equal to a second lower threshold target particulate material flow rate in response to the respective second target particulate material flow rate being below the second lower threshold target particulate material flow rate. Accordingly, the controller may set the target particulate material flow rate from each second metering device to a value within the threshold range (e.g., corresponding to the second upper threshold target particulate material flow rate and the second lower threshold target particulate material flow rate) such that the particulate material flow rate from the second metering device does not exceed a maximum particulate material flow rate (e.g., due to the maximum rotation speed limit of the motor, the threshold particulate material flow rate through the respective primary/secondary lines, etc.) or fall below a minimum particulate material flow rate (e.g., due to the minimum rotation speed limit of the motor, the possibility of seeds being driven out of the trench by the airflow, etc.). As previously discussed, the threshold range may be based on mass flow rate of the particulate material through the metering device.

As previously discussed, the first storage tank 116 and the second storage tank 120 may store different types of particulate material. Accordingly, the first straight line target particulate material flow rate may be different than the second straight line target particulate material flow rate. For example, if the first storage tank 116 stores seed and the second storage tank 120 stores fertilizer, the first straight line target particulate material flow rate (e.g., target seed flow rate) may be significantly greater than the second straight line target particulate material flow rate (e.g., fertilizer flow rate). Furthermore, in certain embodiments, the first straight line target particulate material flow rate and/or the second straight line target particulate material flow rate may be different for each respective metering devices (e.g., to provide a target concentration of the particulate material to each portion of the field).

Each first metering device 60 and a respective second metering device 60 form a pair of metering devices that output respective particulate materials from the storage tanks to a respective primary line 38. As previously discussed, each first metering device outputs the flowable particulate material to the respective primary line 38 via a respective intermediate line 122. Accordingly, each group of row units fluidly coupled to a respective primary line 38 receives the particulate materials from a respective pair of metering devices 60. In certain embodiments, for each pair of metering devices, the controller is configured to set the first compensation factor associated with the first metering device of the pair and the second compensation factor associated with the second metering device of the pair to the lower of the first compensation factor and the second compensation factor. By keeping the first and second compensation factors equal to one another for each pair of metering devices, the ratio of particulate materials (e.g., seed and fertilizer) within each primary line may be substantially maintained even while the flow rate of at least one particulate material is limited (e.g., to the upper threshold target particulate material flow rate or to the lower threshold target particulate material flow rate).

While setting each compensation factor to the lower of the first and second compensation factors is disclosed above, in certain embodiments, this process may be omitted. Accordingly, the controller may not adjust one compensation factor to maintain the proportion of the particulate materials. In addition, while the metering devices are configured to output the particulate material to primary lines in the illustrated embodiment, in other embodiments, at least one metering device may be configured to output the particulate material to another suitable line (e.g., secondary line, a line extending directly between the metering device and a respective row unit, etc.).

Furthermore, while the metering system has two metering assemblies in the illustrated embodiment, in other embodiments, the metering system may include more or fewer metering assemblies (e.g., one metering assembly for each storage tank), each having multiple metering devices configured to output particulate material to respective lines (e.g., primary lines). For example, the air cart may have four storage tanks, and the metering system may include four respective metering assemblies. In such a configuration, a set of third compensation factors may be determined for the third metering devices of the third metering assembly based on the radius of curvature of the path of the agricultural implement, and a set of fourth compensation factors may be determined for the fourth metering devices of the fourth metering assembly based on the radius of curvature of the path of the agricultural implement. In certain embodiments, each third compensation factor may be adjusted such that a respective third target particulate material flow rate associated with a respective third metering device is within a threshold range, and/or each fourth compensation factor may be adjusted such that a respective fourth target particulate material flow rate associated with a respective fourth metering device is within a threshold range.

Furthermore, in certain embodiments, each first metering device of the first metering assembly, a respective second metering device of the second metering assembly, a respective third metering device of the third metering assembly, and a respective fourth metering device of the fourth metering assembly form a group of metering devices that output respective particulate materials from the storage tanks to a respective line (e.g., primary line). For each group of metering devices, the controller may set the first compensation factor associated with the first metering device of the group, the second compensation factor associated with the second metering device of the group, the third compensation factor associated with the third metering device of the group, and the fourth compensation factor associated with the fourth metering device of the group to the lowest of the first compensation factor, the second compensation factor, the third compensation factor, and the fourth compensation factor. By keeping the first, second, third, and fourth compensation factors equal to one another for each group of metering devices, the ratio of particulate materials (e.g., seed and fertilizer) within each line (e.g., primary line) may be substantially maintained even while the flow rate of at least one particulate material is limited (e.g., to the upper threshold target particulate material flow rate or to the lower threshold target particulate material flow rate). In other embodiments, for each group of metering devices, the controller may set the first compensation factor and the second compensation factor to the lower of the first and second compensation factors, and/or the controller may set the third compensation factor and the fourth compensation factor to the lower of the third and fourth compensation factors. In further embodiments, for each group of metering devices, the controller may set any suitable set of compensation factors to the lower/lowest compensation factor of the set.

Furthermore, in certain embodiments, the controller may set (e.g., in response to operator input) the target particulate material flow rate for each metering device of at least one metering assembly to the straight line target particulate material flow rate for the respective metering assembly. Accordingly, with respect to the at least one metering assembly, no compensation is provided for the curved path of the agricultural implement. Each metering assembly for which the target particulate material flow rates of the metering devices are set to the respective straight line target particulate material flow rate may be considered a non-curve compensated metering assembly, and each metering assembly for which the target particulate material flow rates of the metering devices are determined based on the radius of curvature of the path of the agricultural implement may be considered a curved compensated metering assembly. In certain embodiments, the process of setting compensation factors of each set to the lower/lowest compensation factor of the set for each group of metering devices, as described above, may only be performed for compensation factors associated with the curve compensated metering assemblies. Accordingly, the controller may not adjust the compensation factors associated with the non-curved compensated metering assemblies. As such, the proportion of the particulate materials from the non-curved compensated metering assemblies may not be maintained.

Furthermore, while each pair/group of metering devices (e.g., including one metering device 60 of the first metering assembly 114 and one metering device 60 of the second metering assembly 118) outputs respective particulate materials from the storage tanks to a single respective primary line 38 in the illustrated embodiment, in other embodiments, each metering device of the pair/group may output respective particulate material to a respective line (e.g., primary line). For example, each first metering device of the first meter assembly may output particulate material to a respective first primary line, and each second metering device of the second metering assembly may output particulate material to a respective second primary line. Each first primary line may be fluidly coupled to a first air source, and each second primary line may be fluidly coupled to a second air source. In addition, each first primary line may be fluidly coupled to a respective first header, and each second primary line may be fluidly coupled to a respective second header. Secondary lines may extend from each first header to respective first particulate material tubes of the row units, and secondary lines may extend from each second header to respective second particulate material tubes of the row units. Accordingly, each row unit may have a first particulate material tube configured to deposit a first particulate material in the soil and a second particulate material tube configured to deposit a second particulate material in the soil.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A particulate material metering system for an agricultural implement, comprising:
a controller comprising a memory and a processor, wherein the controller is configured to:
determine a radius of curvature of a path of a lead vehicle coupled to the agricultural implement;
determine a lead time of the lead vehicle relative to the agricultural implement based on a speed of the lead vehicle, the agricultural implement, or a combination thereof, and a longitudinal offset distance between the lead vehicle and the agricultural implement;
determine a radius of curvature of a path of the agricultural implement based on the radius of curvature of the path of the lead vehicle at a determination time, wherein the determination time is a current time minus an offset time, and the offset time is based on the lead time;
determine a plurality of target particulate material flow rates of a respective plurality of metering devices of the particulate material metering system based on the radius of curvature of the path of the agricultural implement; and
output signals to the plurality of metering devices indicative of the plurality of target particulate material flow rates.

2. The particulate material metering system of claim 1, wherein determining the radius of curvature of the path of the lead vehicle comprises determining a rate of change in course of the lead vehicle and determining the radius of curvature of the path of the lead vehicle based on the rate of change.

3. The particulate material metering system of claim 1, wherein the controller is configured to determine the radius of curvature of the path of the agricultural implement by multiplying the radius of curvature of the path of the lead vehicle at the determination time by a scale factor.

4. The particulate material metering system of claim 3, wherein the scale factor increases from 1 as the radius of curvature of the path of the lead vehicle decreases.

5. The particulate material metering system of claim 1, wherein the offset time is equal to the lead time minus a propagation delay time, and the propagation delay time is a time sufficient for particulate material to flow from the plurality of metering devices to a corresponding plurality of row units coupled to the agricultural implement.

6. The particulate material metering system of claim 5, wherein the offset time is set to zero if the propagation delay time is greater than or equal to the lead time.

7. The particulate material metering system of claim 1, wherein the plurality of metering devices is configured to provide particulate material to a corresponding plurality of row units coupled to the agricultural implement, and determining the plurality of target particulate material flow rates of the respective plurality of metering devices comprises determining the plurality of target particulate material flow rates such that the plurality of target particulate material flow rates vary substantially linearly among the corresponding plurality of row units along a lateral axis of the agricultural implement.

8. The particulate material metering system of claim 1, wherein determining the plurality of target particulate material flow rates of the respective plurality of metering devices based on the radius of curvature of the agricultural implement comprises limiting each target particulate material flow rate of the plurality of target particulate material flow rates to a threshold target particulate material flow rate range.

9. A particulate material metering system for an agricultural implement, comprising:
a controller comprising a memory and a processor, wherein the controller is configured to:
determine a radius of curvature of a path of the agricultural implement;
determine a first plurality of target particulate material flow rates of a respective first plurality of metering devices of the particulate material metering system based on the radius of curvature of the agricultural implement, wherein each first target particulate material flow rate of the first plurality of target particulate material flow rates is determined by multiplying a first straight line target particulate material flow rate by a respective first compensation factor of a first plurality of compensation factors;
reduce each first compensation factor of the first plurality of compensation factors such that a respective first target particulate material flow rate of the first plurality of target particulate material flow rates associated with a respective first metering device of the first plurality of metering devices is equal to a first upper threshold target particulate material flow rate in response to the respective first target particulate material flow rate being above the first upper threshold target particulate material flow rate, and increase each first compensation factor of the first plurality of compensation factors such that the respective first target particulate material flow rate of the first plurality of target particulate material flow rates associated with the respective first metering device of the first plurality of metering devices is equal to a first lower threshold target particulate material flow rate in response to the respective first target particulate material flow rate being below the first lower threshold target particulate material flow rate; and output first signals to the first plurality of metering devices indicative of the first plurality of target particulate material flow rates.

10. The particulate material metering system of claim 9, wherein the controller is configured to:

determine a second plurality of target particulate material flow rates of a respective second plurality of metering devices of the particulate material metering system based on the radius of curvature of the agricultural implement, wherein each second target particulate material flow rate of the second plurality of target particulate material flow rates is determined by multiplying a second straight line target particulate material flow rate by a respective second compensation factor of a second plurality of compensation factors;

reduce each second compensation factor of the second plurality of compensation factors such that a respective second target particulate material flow rate of the second plurality of target particulate material flow rates associated with a respective second metering device of the second plurality of metering devices is equal to a second upper threshold target particulate material flow rate in response to the respective second target particulate material flow rate being above the second upper threshold target particulate material flow rate, and increase each second compensation factor of the second plurality of compensation factors such that the respective second target particulate material flow rate of the second plurality of target particulate material flow rates associated with the respective second metering device of the second plurality of metering devices is equal to a second lower threshold target particulate material flow rate in response to the respective second target particulate material flow rate being below the second lower threshold target particulate material flow rate; and output second signals to the second plurality of metering devices indicative of the second plurality of target particulate material flow rates.

11. The particulate material metering system of claim 10, wherein each first metering device of the first plurality of metering devices and a respective second metering device of the second plurality of metering devices form a pair of metering devices, and for each pair of metering devices, the controller is configured to set the first compensation factor associated with the first metering device and the second compensation factor associated with the second metering device to the lower of the first compensation factor associated with the first metering device and the second compensation factor associated with the second metering device.

12. The particulate material metering system of claim 9, wherein the controller is configured to:

determine a radius of curvature of a path of a lead vehicle coupled to the agricultural implement;

determine a lead time of the lead vehicle relative to the agricultural implement based on a speed of the lead vehicle, the agricultural implement, or a combination thereof, and a longitudinal offset distance between the lead vehicle and the agricultural implement; and determine the radius of curvature of the path of the agricultural implement based on the radius of curvature of the path of the lead vehicle at a determination time, wherein the determination time is a current time minus an offset time, and the offset time is based on the lead time.

13. The particulate material metering system of claim 12, wherein the controller is configured to determine the radius of curvature of the path of the agricultural implement by multiplying the radius of curvature of the path of the lead vehicle at the determination time by a scale factor.

14. The particulate material metering system of claim 12, wherein the offset time is equal to the lead time minus a propagation delay time, and the propagation delay time is a time sufficient for particulate material to flow from the first plurality of metering devices to a corresponding plurality of row units coupled to the agricultural implement.

15. The particulate material metering system of claim 14, wherein the offset time is set to zero if the propagation delay time is greater than or equal to the lead time.

16. A method for controlling a particulate material metering system, comprising:

determining, via a controller, a radius of curvature of a path of a lead vehicle coupled to an agricultural implement;

determining, via the controller, a lead time of the lead vehicle relative to the agricultural implement based on a speed of the lead vehicle, the agricultural implement, or a combination thereof, and a longitudinal offset distance between the lead vehicle and the agricultural implement;

determining, via the controller, a radius of curvature of a path of the agricultural implement based on the radius of curvature of the path of the lead vehicle at a determination time, wherein the determination time is a current time minus an offset time, and the offset time is based on the lead time;

determining, via the controller, a plurality of target particulate material flow rates of a respective plurality of metering devices of the particulate material metering system based on the radius of curvature of the path of the agricultural implement; and outputting, via the controller, signals to the plurality of metering devices indicative of the plurality of target particulate material flow rates.

17. The method of claim 16, wherein determining the radius of curvature of the path of the agricultural implement comprising multiplying the radius of curvature of the path of the lead vehicle at the determination time by a scale factor.

18. The method of claim 17, wherein the scale factor increases from 1 as the radius of curvature of the path of the lead vehicle decreases.

19. The method of claim 16, wherein the offset time is equal to the lead time minus a propagation delay time, and the propagation delay time is a time sufficient for particulate material to flow from the plurality of metering devices to a corresponding plurality of row units coupled to the agricultural implement.

20. The method of claim 19, wherein the offset time is set to zero if the propagation delay time is greater than or equal to the lead time.

\* \* \* \* \*